United States Patent [19]

Kerr et al.

[11] Patent Number: 4,901,265

[45] Date of Patent: Feb. 13, 1990

[54] PSEUDORANDOM DITHER FOR FREQUENCY SYNTHESIS NOISE

[75] Inventors: Richard J. Kerr; Lindsay A. Weaver, both of San Diego, Calif.

[73] Assignee: Qualcomm, Inc., San Diego, Calif.

[21] Appl. No.: 132,348

[22] Filed: Dec. 14, 1987

[51] Int. Cl.$^4$ .............................................. G06F 1/02
[52] U.S. Cl. ...................................... 364/721; 328/14
[58] Field of Search ............... 364/721, 715, 718, 717, 364/745; 328/14

[56] References Cited

U.S. PATENT DOCUMENTS

| | | | |
|---|---|---|---|
| 3,633,017 | 1/1972 | Crooke et al. | 364/721 |
| 3,654,450 | 4/1972 | Webb | 364/721 X |
| 4,328,554 | 5/1982 | Mantione | 364/721 |
| 4,410,954 | 10/1983 | Wheatley, III | 364/701 |
| 4,454,486 | 6/1984 | Hassun et al. | 364/721 X |
| 4,476,536 | 10/1984 | Jones, Jr. | 364/721 |
| 4,652,832 | 3/1987 | Jasper | 364/721 X |
| 4,727,506 | 2/1988 | Fling | 364/745 |

OTHER PUBLICATIONS

Schuchman, "Dither Signals and Their Effect on Quantization Noise", IEEE Transactions on Communication Technology, Dec. 1964, pp. 163–165.

Primary Examiner—Gary V. Harkcom
Assistant Examiner—Tan V. Mai
Attorney, Agent, or Firm—Brown, Martin, Haller & McClain

[57] ABSTRACT

A method and apparatus for reducing spurious output noise in digital frequency synthesizers employing sine amplitude converters connected to Digital-to-Analog converters to generate analog waveforms from sine amplitude data. Random or pseudorandom numbers having a value equal to or less than plus or minus one-half of a minimum quantization step or value change for the sine amplitude data are generated and added to the sine amplitude data with the resulting sum being transferred to the Digital-to-Analog converter. In one embodiment, a summation circuit is connected between an output of the sine function converter and an input of the Digital-to-Analog converter and also has a second input connected to a pseudorandom number generator which provides Pseudorandom numbers varying in value over a range of $\pm\frac{1}{2}^{n+1}$ times a least significant step value, or bit for base 2, of a corresponding Digital-to-Analog input data value where n is greater than or equal to 1.

20 Claims, 3 Drawing Sheets

SINE DATA | S1 | S2 | S3 | S4 | S5 | S6 | S7 | S8 | S9 | S10 | S11 | S12 | S13 | S14 | S15 | S16 |

(PSEUDO) RANDOM | R1 | R2 | R3 | R4 | R5 | R6 | R7 | R8 | ... | Rn |

DAC INPUT | D1 | D2 | D3 | D4 | D5 | D6 | D7 | D8 |

FIG. 4

PSEUDORANDOM DITHER FOR FREQUENCY SYNTHESIS NOISE

FIELD OF THE INVENTION

The present invention relates to frequency synthesis and more particularly to a method and apparatus for reducing output spurious noise in digital frequency synthesizers by adding a random or pseudorandom number to digital wavefunction amplitude data before conversion to an analog output signal. The invention further relates to synthesizing frequencies with higher resolution for give bit widths for the amplitude data input to a Digital-to-Analog converter.

BACKGROUND OF THE ART

A variety of frequency synthesizers have been developed for use in digital communication systems as reference signal sources or oscillators. However, as newer communication systems are developed for serving larger numbers of users, frequency resolution and noise generation become increasingly significant problems. This is due to the fact that larger numbers of communication channels are desired within given bandwidth allocations which results in continually smaller, minimum, separations between adjacent channels. Therefore, to maintain adequate communication characteristics the reference or mixing frequencies for each channel must be resolved with increasing accuracy and noise and interference must be kept to a minimum.

Direct Digital Synthesizers (DDS) are finding extensive use in advanced digital communication systems especially for generating variable reference frequencies required by frequency hopping and large multi-channel systems or schemes. DDS synthesizers offer relatively high frequency resolution, allow efficient interface with typical digital control circuitry and commands, and provide high speed operation, and low power consumption all of which are a must in satellite and mobile communication systems.

DDS frequency synthesizers typically comprise a digital phase accumulator, a periodic wave function conversion element, in the form of Read Only Memory (ROM) devices, and a Digital-to Analog Converter (DAC). The phase accumulator is used for incrementing a phase angle which is applied at regular intervals to the conversion element which converts accumulated phase angles to a periodic wavefunction amplitude. The wavefunction amplitude, such as the amplitude of a sine function, is then converted into an analog waveform. That is, the instantaneous amplitude at given points during the period of the sine function are computed as digital values from accumulated phase and then transferred to a Digital-to-Analog Converter (DAC) for conversion to an analog signal having the same frequency as the phase angle data.

When digital information, such as a sine amplitude, is converted to analog form, spurious noise is created due to a quantization effect. It is well known that for any digital to analog conversion process that there is an error of $\pm\frac{1}{2}$ the smallest quantization step, or Least Significant Bit (LSB) for base two digital data, for DAC input data as it is translated to discrete analog amplitude levels. This error creates spurious and harmonic noise on a periodic basis.

For typical digital conversion, the spurious noise resulting from quantization error generates spectral peaks at several predictable frequencies. These peaks have been found to have an energy level that falls roughly 6 dB per DAC input bit, down in energy level from a desired fundamental output frequency. This reflects a correlation between DAC amplitude resolution and the magnitude of any resulting quantization error. The number of input bits used by the DAC, which determines the DAC resolution, times the −6 dB factor represents the energy level or amplitude of the spurious noise produced during the conversion process. For an 8-bit wide DAC input the peak noise is roughly 48 dB below the fundamental frequency while a 12-bit wide DAC conversion produces roughly a 72 dB difference.

Therefore, to decrease spurious noise peaks in the DAC output and improve frequency resolution for a DDS circuit, the DAC input bit width or resolution can be increased. However, increasing the DAC input resolution means increasing the complexity of the DAC itself which leads to slower speed, increased power consumption, lower reliability and higher costs, none of which are desirable in communication systems. A trade off is reached between the above design factors and the maximum amount of noise a system can withstand for adequate operation.

Several techniques have been employed in an attempt to improve frequency resolution and overcome quantization noise in DDS circuits. Exemplary techniques are found in U.S. Pat. Nos. 4,652,832 and 4,410,954 issued to Steven C. Jasper and Charles Wheatly, III, respectively.

In U.S. Pat. No. 4,410,954, a phase accumulator is employed as a direct digital integrator and the typical sine amplitude look-up table and DAC elements eliminated. A dither signal is added to the input or output of the accumulator to randomly jitter the phase vectors or increments in small steps and spread spectral noise out over the spectrum of interest. This method eliminates quantization and conversion errors associated with the DAC and sine amplitude elements by eliminating those elements. However, this approach also eliminates the ability to achieve higher frequency resolution through the use of advanced sine amplitude conversion techniques.

In U.S. Pat. No. 4,652,832 a digital dither signal is added to the output of a phase accumulator before conversion into sine and cosine data through the use of a series of look-up tables. The accuracy of the conversion process for the sine and cosine amplitude data is said to be improved which leads to lower quantization noise in the subsequent DAC conversion process. However, an increase in accuracy or resolution at intermediate stages does not eliminate the effects of the DAC quantization error.

To adapt to increasing resolution requirements for communication systems and technology, a new method is needed to minimize spurious noise generated in Direct Digital Synthesizers and obtain optimum frequency resolution and system response without increased synthesizer complexity.

SUMMARY OF THE INVENTION

With the above problems of the art in mind it is a purpose of the present invention to provide a method and apparatus for decreasing spurious noise output from a direct digital synthesizer.

One advantage of the present invention is that it reduces noise output during direct digital frequency synthesis with a minimum of complexity or parts.

Another advantage of the present invention is that it provides an analog frequency output from a direct digital frequency synthesizer at a higher resolution than the apparent predefined input resolution.

These and other purposes, objects, and advantages are achieved by a method for reducing spurious output noise response in direct digital frequency synthesis by adding random or pseudorandom numbers to digital sine amplitude numbers which are subsequently converted to analog form by a Digital-to-Analog converter (DAC). This method is preferably implemented in a digital synthesizer employing a sine function converter for converting phase data to digital sine amplitude numbers by use of sine look-up tables or computation and a DAC for generating an analog signal in response to the sine amplitude numbers.

The method of the present invention provides a sequence of randomly or pseudorandomly varying numbers which are added one to each of the sine amplitude numbers during transfer to the DAC. The resulting addend is then truncated before being input into the DAC. The pseudorandom numbers are generally scaled to a predetermined magnitude before being added to the sine amplitude numbers.

In further aspects of the method of the present invention, the randomly or pseudorandomly varying numbers are generated with magnitudes equal to or between $\pm \frac{1}{2}$ a minimum quantization step for an input resolution for the Digital to Analog converter. In preferred embodiments, the sine numbers are digital words k bits wide and the random or pseudorandom numbers are digital words n bits wide which are added to said sine amplitude words beginning at $\pm \frac{1}{2}$ a least significant bit value of the DAC resolution and generally have a value in the range of $\pm \frac{1}{2}^n$ times said least significant bit value where n is greater than or equal to 1.

The method of the present invention is accomplished in an apparatus comprising a random or pseudorandom number generator connected in series with a scaler element for receiving generated pseudorandom numbers and for scaling the magnitude of the pseudorandom numbers by a predetermined amount and a summation element for adding together two numbers to generate an addend. The summation element has a first input connected to an output of the sine function converter, a second input connected to the scaler element, and an output connected to an input of the DAC. A truncation means connected between the summation means output and the DAC truncates the addend to a predetermined resolution.

In further aspects of the apparatus of the present invention, the truncation means has an output with a bit width equal to or less than a predetermined resolution bit width for the DAC. The random or pseudorandom number generator produces numbers having magnitudes equal to or between $\pm \frac{1}{2}$ a pre-selected minimum quantization step for the DAC.

BRIEF DESCRIPTION OF THE DRAWINGS

The novel features of the present invention may be better understood from the accompanying description when taken in conjunction with the accompanying drawings in which:

FIG. 4 illustrates relative bit positions for amplitude, pseudorandom number and Digital-to-Analog Converter input data employed in the circuit of FIG. 1.

DETAILED DESCRIPTION OF A PREFERRED EMBODIMENT

The present invention provides a method and apparatus for decreasing the impact of noise or the relative energy level of spurious noise with respect to a desired fundamental frequency in the output of a Direct Digital frequency Synthesizer (DDS). This is accomplished by adding random or pseudorandom numbers to sine amplitude numbers and then selecting a portion of the resulting sum for conversion to analog form. The apparatus of the present invention utilizes a digital summation circuit to add sine amplitude numbers to randomly or pseudorandomly generated numbers and then truncate the sum to a desired value before conversion to an analog form. This causes the output analog waveform to dither about a series of amplitudes at various frequencies and spread spurious noise out over the entire signal spectrum.

Figure 1:
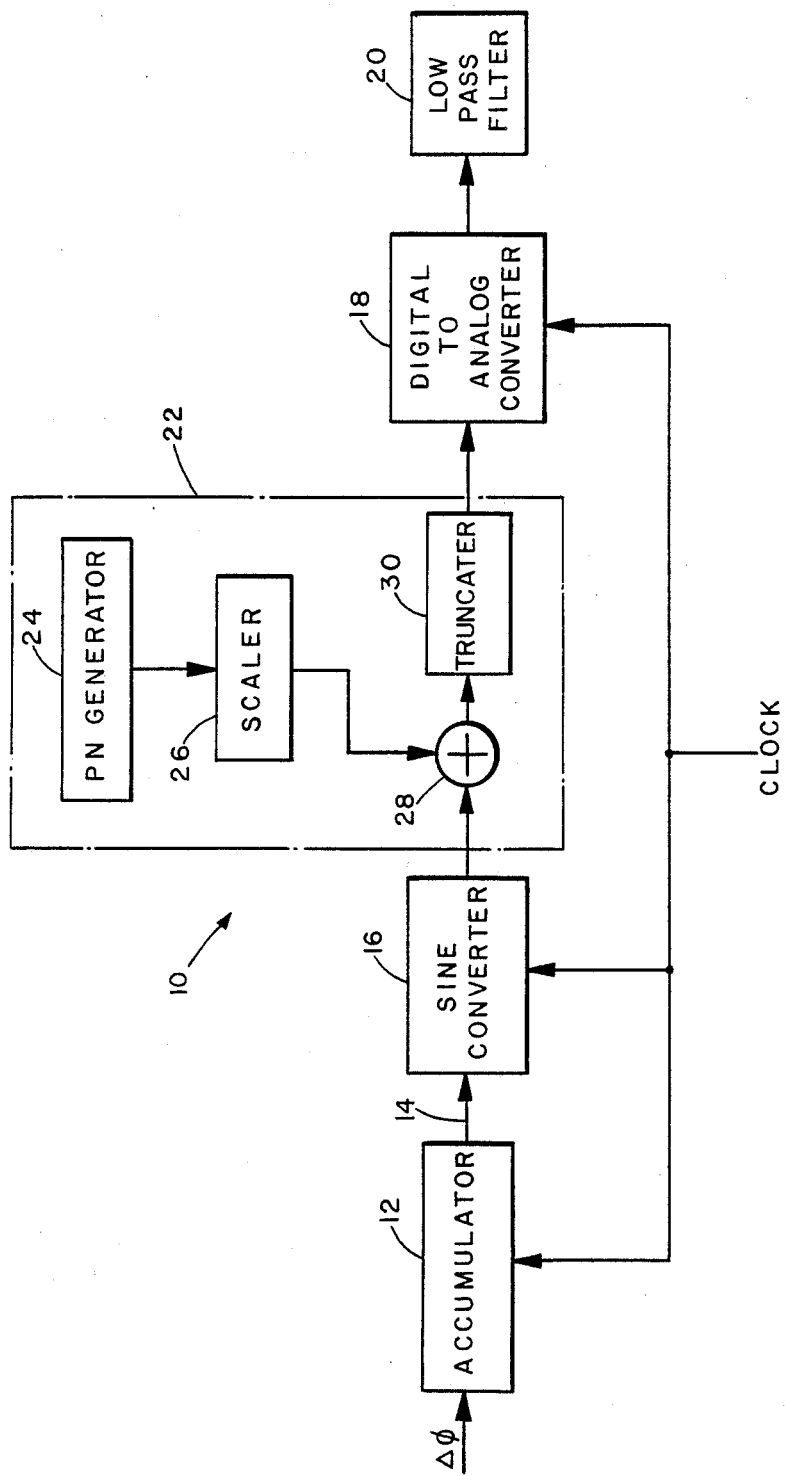
FIG. 1 illustrates a schematic diagram of a direct digital synthesizer incorporating the method and apparatus of the present invention.

A DDS circuit constructed and operating according to the principles of the present invention is illustrated in schematic form in FIG. 1. In FIG. 1, a DDS synthesizer 10 is illustrated using a phase angle accumulator 12 for receiving, storing, and transferring phase angle information in the form of changes in a phase angle $\phi$. The phase angle information $\Delta\phi$, is typically commuted or provided by digital control circuitry such as, but not limited to, microprocessors or various preprogrammed memory elements and represents relative phase changes for desired output frequencies. The phase angle data is transferred into the accumulator 12 where it is accumulated to form digital (phase) values or words that are transferred, typically as a series of bits into a periodic function converter 16.

The phase angle information is transferred along a data bus or path 14, to the periodic function converter 16 which generates a digital amplitude signal according to a mapping of the digital phase angle information onto a periodic function. Generally it is desired and known to employ a sine function for the conversion function of the converter 16 although other waveforms can be employed where desired. An exemplary function for this conversion is a sine amplitude output which is related to a phase input according to the relationship:

$$\sin(2\pi i/2N)$$

where N is the number of bits in each data word transferred from the phase accumulator 12 and i is the current state of the accumulator.

The converter or sine converter 16 is configured to provide as perfect a sinusoidal output function as reasonable for the given circuit requirements (complexity, power, etc.). As discussed above, the sine amplitude converter 16 typically comprises one or more ROM devices which act as look-up tables for converting input phase information into output sine amplitude information. One such converter is disclosed in copending U.S. patent application Ser. No. 07/145,789.

As previously described, the resolution of a digital to analog conversion process is directly related to the significant number of terms used for the sine amplitude data. That is, when using a multi-bit digital word (k bits wide) for the sine amplitude data, the energy level of the spurious noise is approximately 6 db down in energy level from the desired output frequency for every bit used in the sine converter 16 output data. Therefore, to increase resolution, the sine amplitude data of the preferred embodiment is configured to be 16 bits wide, although other data widths can be used with the present invention.

The phase accumulator 12 is periodically updated by the input of new phase increment values. The phase data stored in the accumulator 12 is then transferred, after a predetermined accumulation period or at a predetermined clocking rate, to the sine amplitude conversion circuit 16 for conversion into an amplitude associated with the input phase position along the sine function curve. This amplitude or amplitude value is then applied in the form of a digital number or word to a Digital-to-Analog Converter DAC 18 to produce an analog waveform. A system clock (not shown) is connected to the accumulator 12, sine converter 16, and DAC 18 elements to clock or gate the transfer of data into and out of each processing element in synchronization.

The DAC 18 represents circuitry known in the art for receiving digital data and generating an analog waveform output. The resolution of DAC 18 depends upon the mathematical significance or number of bits used for the input data to be converted. However, as discussed above, there is always some quantization uncertainty in the output of the DAC 18 for the minimum quantization step or least significant bits of the DAC input.

To decrease system complexity and maximize conversion speed without significant loss of resolution, the DAC 18 is configured to accept an 8-bit wide input value. Therefore, the output of the sine converter 16 is truncated by accepting only the 8 Most Significant Bits or most significant portion of the sine amplitude data.

Where desired, a low pass filter 20 is placed after the DAC 18 in order to remove some of the noise components generated during the conversion process. However, such a filter does not remove significant amounts of spurious noise produced by the digital to analog conversion. Such a filter cannot be made equally efficient at all frequencies in the spectral band of interest without significantly impacting on the desired fundamental output frequency.

The DDS circuitry as described to this point, performs frequency generation steps and comprises functional elements understood or known in the art which unfortunately generate undesirable spurious noise.

Figure 2:
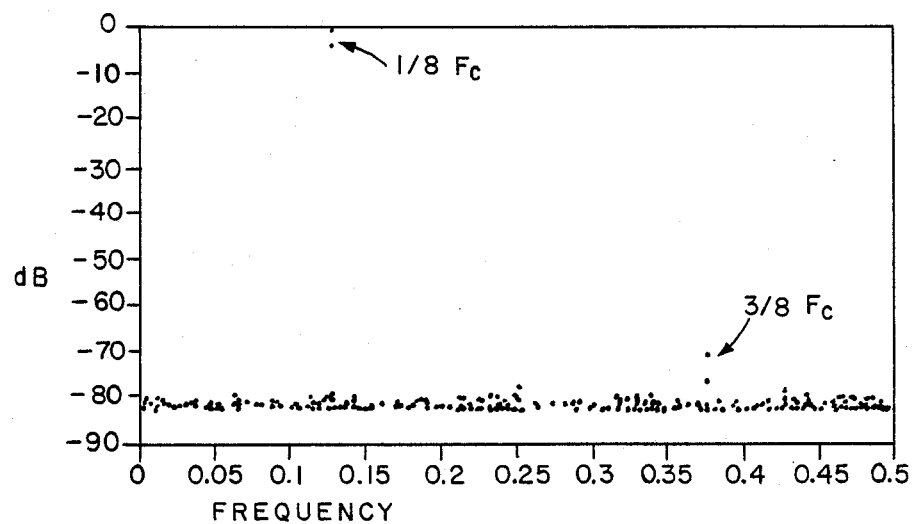
FIG. 2 illustrates a graphic representation of an exemplary amplitude versus frequency noise distribution for the circuit of FIG. 1 with no noise suppression.

FIG. 2 illustrates a plot of a simulated signal output for a DDS circuit as illustrated in portions of FIG. 1, without any compensation for this spurious noise. In FIG. 2, a plot of the signal level output versus frequency is shown for the generation of a desired or primary analog output frequency at about 0.125 times a Fundamental clock frequency $F_c$. The peak level output of 0 db at $1/8F_c$ shows the desired output. However, there are several harmonics also generated such as the second at $\frac{1}{4}F_c$ and third at $\frac{3}{8}F_c$. These spurious noise peaks or spurs, which result from the quantization error, contribute significantly to the output of the DDS 10 and create problems for frequency resolution and tracking even though the overall noise level or response of the DDS 10 circuit is less than 140 to 160 dB below the $1/8F_c$ output frequency.

To solve the problem of quantization spurs and harmonic noise, the present invention applies a unique digital dithering function to the sine amplitude data being transferred to the DAC 18. This is accomplished by the elements illustrated in FIG. 1 within the dashed outline 22. These elements comprise an apparatus for reducing spurious harmonic noise by applying a sequence of pseudorandomly or randomly varying numbers, one each to a corresponding sine amplitude number.

A pseudorandom or random number is generated using a hardware number generator 24. The random or pseudorandom number generator 24 comprises circuitry known in the art of communications for generating a sequence of substantially randomly varying numbers Pseudorandom number and pseudorandom noise generators for producing numbers satisfying the pseudorandom criteria are known to those skilled in the art. Exemplary pseudonoise generators are discussed in the literature as found in "Error Correcting Codes", by W. W. Peterson, Wiley, 1961, which is incorporated herein by reference. The generators disclosed therein are exemplary of the types of known generators or coding schemes usable as the basis of the pseudorandom generator 24.

Random number generators, such as those based, on thermal noise, are also known in the art and are not described in further detail here. For purposes of clarity the following disclosure describes the application of pseudorandom numbers, since this is the preferred embodiment of the present invention. However, it will be readily understood by those skilled in the art that truly random numbers fitting the same criteria can be used by the method of the invention to achieve the desired results.

In adding pseudorandom numbers to the sine amplitude numbers, the absolute magnitude of the pseudorandom numbers produced by the generator 24 may require adjustment or scaling relative to the value of the desired DAC 18 input. That is, it is desirable to limit the dithering of the sine amplitude numbers to fall within a specific resolution value or range for the DAC 18. Otherwise, a significant amount of desired spectral peaks are also spread across the output spectrum. Therefore, the absolute scale of the pseudorandom (or random) numbers can be adjusted so that they are equal to or less than a pre-selected magnitude and add only to a lower resolution value of the DAC 18 input. However, those skilled in the art will readily understand that the specific magnitudes chosen depend on the DAC resolution used as well as specific sine converter applications. In addition, preselected constants can also be added to or with the pseudorandom numbers for satisfying other processing requirements where desired.

It has been found that an optimum magnitude or range of magnitudes for the pseudorandom numbers exits when they are confined to be equal to or less than $\pm\frac{1}{2}$ of the minimum quantization step or minimum value step used by the DAC 18 input. This creates the spectral distribution of quantization error noise peaks without altering the desired amplitude numbers to overlap each other and be randomly distributed over the spectrum.

The scaling of the pseudorandom numbers is easily accomplished by several means such as a pre-alignment of data bits from a digital generator 24 on an input data bus for an adder 28 or scale shifting computations such as 1's complement or constant value additions in a separate scaler 26. The circuitry used for such a scaler 26 is well known in the art and not described in further detail here. The scaler 26 can also be dynamically controlled so that alternate resolution values can be utilized for the DAC 18, or alternate DAC's used without requiring an entire new converter circuit. This is especially useful in integrated circuit applications.

While other digital schemes can be used, the preferred embodiment is described using base 2 digital number representation for the amplitude and random numbers. This format presents a fixed minimum quantization step of $\frac{1}{2}$ the Least Significant Bit (LSB). However, the present invention is equally applicable to sine amplitude numbers having alternate forms of representation and minimum value separations.

The pseudorandom generator 24 produces random numbers which range in size from $\pm\frac{1}{2}$ of the LSB of the DAC 18 input to $\pm\frac{1}{2}^{(n+1)}$ of the LSB, where n is the number of bits produced by the pseudorandom generator 24. In the preferred embodiment, the number of bits generated by the pseudorandom generator 24 is 8. The number of output bits employed by the pseudorandom generator 24 depends upon the degree of resolution desired. The pseudorandom generator number reduces the spur height by 6 db per pseudorandom number bit width when added to a corresponding sine amplitude data bit even though the input to the DAC 18 is truncated.

The pseudorandom number is transferred to a digital adder 28 which comprises circuitry known in the art for summing two or more digital values together. The adder 28 is connected between the sine converter 16 and the DAC 18 with the sine converter 16 being connected to a first input and the DAC 18 to a summation output. The output pseudorandom generator 24 is connected to a second input of the adder 28.

The data words comprising the sine amplitude data comprise more data bits than the desired DAC input word by the same number of bits produced by the pseudorandom generator 24. As previously discussed the DAC 18 is connected to receive only the desired number of input bits, here 8. In the alternative, especially where other types of digital signals are employed, a separate truncation element 30 can be employed to transfer only a portion of the adder 28 output to the DAC 18 as desired.

The adder 28 adds a pseudorandom number from the pseudorandom generator 24 to each sine amplitude number output by the converter 16. The addition of a sine amplitude number k bits wide and a pseudorandom number produces a digital value M bits wide. The resulting sum is truncated to a value t bits wide for conversion to the analog waveform signal. The smaller number of t bits maintains a simplified DAC and circuit efficiency and speed. In the preferred embodiment, the value chosen for t is 8 to establish a desired 8-bit DAC input value.

It is important to note that in summing digital values in the adder 28, the Most Significant Bit (MSB) of the pseudorandom numbers are aligned or summed with $\pm\frac{1}{2}$ the DAC 18 input LSB position of the sine amplitude data. This is illustrated in FIG. 4 where a series of representative digital data word bit positions are illustrated.

In FIG. 4, the 16 bit wide output from the sine converter 16 is illustrated as a series of bits S1 through S16. This represents the 16 bits in the sine amplitude output data. The pseudorandom numbers generated by the generator 24 are illustrated as an n bit wide (Pseudo)-random sequence. The preferred embodiment will only use the first 8 bits, R1 through R8, although larger bit widths are possible. The bit positions of the random number, R1 through R8, are aligned with the last 8 bits, S9 through s16, of the sine amplitude numbers. The final 8 bit DAC input (t=8) number selected for the DAC 18 is illustrated as the 8 bit series D1 through D8. These 8 bits represent the selection of only the 8 MSB bits from the summation in the adder 28. Therefore, the alignment of the pseudorandom numbers are seen to be with $\pm\frac{1}{2}$ the LSB for the input to the DAC 18.

This process takes the $\frac{1}{2}$ LSB quantization uncertainty and randomly distributes it in frequency to spread the spectrum of the noise over the entire Nyquist bandwidth. The energy which was previously concentrated in several discrete peaks is, thus, spread out. This in effect reduces the energy of noise spurs or harmonics at the expense of adding a small percentage of this noise to every frequency over the Nyquist range.

Figure 3:
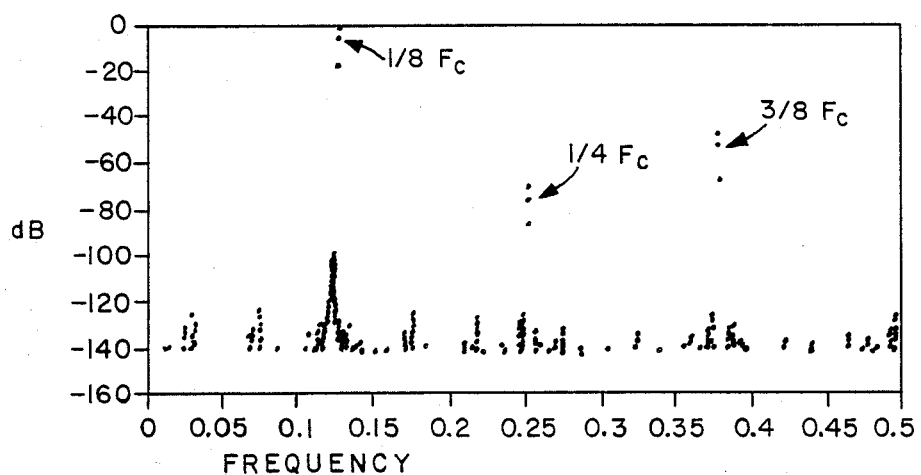
FIG. 3 illustrates a graphic representation of an exemplary amplitude versus frequency noise distribution for the circuit of FIG. 1 with noise suppression.

FIG. 3, shows a simulated output for the DDS 10 circuit as shown FIG. 1, with pseudorandom dither being applied to the sine amplitude data before conversion. The result of this dithering is to raise the noise floor level in the overall signal output up to about 80 dB below the fundamental frequency maximum. However, spurious noise peaks are now suppressed and have a much lower amplitude than before, which approaches that of the remaining noise, and as such are at least −70 dB down from the desired fundamental frequency output energy level. This represents an improvement over the −48 dB fall off obtained without dithering.

Therefore, what has been described is a new method and apparatus for use with direct digital frequency synthesizers which reduces the impact of spurious or harmonic output noise. The method and apparatus achieve a reduction in spurious noise or output response that provides an analog waveform resolution equivalent to a higher resolution DAC circuit without the associated increase in complexity and decrease in speed.

The foregoing description of a preferred embodiment has been presented for purposes of illustration and description. It is not intended to be exhaustive nor to limit the invention to the precise form disclosed, and many modifications and variations are possible in light of the above teaching. An example is implementation of the digital conversion and addition in other than base 2 and employing other than 8 or 16 bit data buses.

The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method of reducing spurious response output from a digital frequency synthesizer where the synthesizer employs a phase angle accumulator connected to a sine function converter to convert phase angle data to digital sine amplitude numbers, and with an output of the sine converter connected to a Digital-to-Analog converter to generate an analog signal in response to the since amplitude numbers, comprising the steps of:
    providing a sequence of pseudorandomly varying numbers;
    adding one of said pseudorandomly varying numbers to each of said sine amplitude numbers output by said sine function converter; and
    truncating a resulting sum before input to said Digital-to-Analog converter.

2. The method of claim 1 wherein the step of providing further comprises the step of scaling said pseudorandomly varying numbers to a predetermined magnitude.

3. The method of claim 1 wherein the Digital-to-Analog converter uses a pre-selected minimum quantization step for input data and the step of providing psuedorandom numbers further comprises the step of:
    generating pseudorandomly varying numbers having magnitudes equal to or between $\pm\frac{1}{2}$ the minimum quantization step of the Digital-to-Analog converter input numbers.

4. The method of claim 3 wherein the pseudorandom and sine amplitude numbers each comprise digital words n and k bits wide respectively and the step of adding comprises adding said pseudorandom number bits to said sine amplitude bits beginning at $\pm\frac{1}{2}$ a least significant bit value of the Digital-to-Analog converter resolution.

5. The method of claim 4 wherein the step of generating further comprises the step of providing pseudorandom numbers having a value in the range of $\pm\frac{1}{2}^n$ times said least significant bit value where n is greater than or equal to 1.

6. An apparatus for reducing spurious output response in a direct digital frequency synthesizer, employing a phase angle accumulator connected to a sine function converter to convert phase data to digital amplitude numbers and being further connected to a Digital-to-Analog converter which generates an analog signal according to the amplitude numbers, comprising:
    a pseudorandom number generator;
    scaler means for receiving generated pseudorandom numbers and for scaling a magnitude of said pseudorandom numbers by a predetermined amount; and
    summation means for adding together two numbers to generate a sum, having a first input connected to an output of said sine function converter, a second input connected to said sine function converter, a second input connected to an output of said scaler, and an output connected to the input of said Digital-to-Analog converter.

7. The apparatus of claim 6 further comprising truncation means connected between said summation means output and said Digital-to-Analog converter input for truncating said sum to a predetermined resolution.

8. The apparatus of claim 7 wherein said truncation means has an output with a bit width equal to or less than a predetermined resolution bit width of said Digital-to-Analog converter.

9. The apparatus of claim 6 wherein said pseudorandom number generator produces numbers having magnitudes equal to or between $\pm\frac{1}{2}$ a pre-selected minimum quantization step of said Digital-to-Analog converter.

10. The apparatus of claim 9 wherein each sine amplitude number comprises digital words k bits wide and said pseudorandom number source comprises bit generation means for producing numbers in the form of digital words n bits wide and said summation means adds said pseudorandom number words to said sine amplitude words beginning at $\pm\frac{1}{2}$ a least significant bit value of the Digital-to-Analog converter resolution.

11. The apparatus of claim 10 wherein said bit generation means produces pseudorandomly varying numbers having a value in the range of $\pm\frac{1}{2}^n$ times said least significant bit value where n is greater than or equal to 1.

12. A method of reducing spurious response from a digital frequency synthesizer where the synthesizer employs a phase angle accumulator connected to a sine function converter to convert phase angle data to digital sine amplitude numbers, and with an output of the sine converter connected to a Digital-to-Analog converter which generates an analog signal in response to the sine amplitude numbers, comprising the steps of:
    providing a sequence of randomly varying numbers;
    adding one of said randomly varying numbers to each of said sine amplitude numbers; and
    truncating a resulting sum before input to said Digital-to-Analog converter.

13. The method of claim 12 further comprising the step of scaling said random numbers to a predetermined magnitude.

14. The method of claim 12 wherein the step of providing random numbers further comprises the step of:
    generating randomly varying numbers having magnitudes equal to or between $\pm\frac{1}{2}$ the minimum quantization step of the Digital-to-Analog converter input numbers.

15. The method of claim 14 wherein the generated random and sine amplitude numbers each comprise digital data words n and k bits wide respectively and the step of adding comprises adding said random number bits to said sine amplitude bits beginning at $\pm\frac{1}{2}$ a least significant bit value of the Digital-to-Analog converter resolution.

16. The method of claim 15 wherein the step of generating randomly varying numbers further comprises the step of providing random numbers having a value in the range of $\pm\kappa n$ times said least significant bit value where n is greater than or equal to 1.

17. An apparatus for reducing spurious output response in a direct digital frequency synthesizer, employing a phase angle accumulator connected to a sine function converter to convert phase data to digital amplitude numbers and being further connected to a Digital-to-Analog converter which generates an analog signal according to the amplitude numbers, comprising:
    summation means for adding together two or more numbers to generate a sum, having a first input connected to an output of said sine function converter and an output connected to the input to said Digital-to-Analog converter;
    a random number generator connected to a second input of said summation circuit; and
    scaler means connected between said summation means second input and said random number generator for receiving generated random numbers and for scaling a magnitude of said random numbers by a predetermined amount.

18. The apparatus of claim 17 further comprising truncation means connected between said summation means output and said Digital-to-Analog converter input for truncating said sum to a predetermined resolution.

19. The apparatus of claim 17 wherein said random number generator produces numbers having magnitudes equal to or between ±½ a pre-selected minimum quantization step of said Digital-to-Analog converter.

20. The apparatus of claim 19 wherein each sine amplitude number comprises digital words k bits wide and said random number source comprises bit generation means for producing numbers in the form of digital words n bits wide and said summation means adds said random number words to said sine amplitude words beginning at ±½ a least significant bit position of the Digital-to-Analog converter resolution.

* * * * *